(12) United States Patent
Barsness et al.

(10) Patent No.: US 8,290,937 B2
(45) Date of Patent: Oct. 16, 2012

(54) ESTIMATING AND MONITORING QUERY PROCESSING TIME

(75) Inventors: Eric L. Barsness, Pine Island, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 12/871,102

(22) Filed: Aug. 30, 2010

(65) Prior Publication Data

US 2012/0054175 A1    Mar. 1, 2012

(51) Int. Cl.
*G06F 7/00* (2006.01)
*G06F 17/30* (2006.01)

(52) U.S. Cl. ......... 707/719; 707/E17.017; 707/E17.075; 707/E17.132

(58) Field of Classification Search .................. 707/718, 707/719, 721, 768, 769, E17.017, E17.075, 707/E17.132, 713, 751, E17.131
See application file for complete search history.

(56) References Cited

U.S. PATENT DOCUMENTS

| | | | | | |
|---|---|---|---|---|---|
| 5,805,898 | A | * | 9/1998 | Barsness et al. | 717/175 |
| 5,960,206 | A | * | 9/1999 | Barsness et al. | 717/174 |
| 7,707,000 | B2 | * | 4/2010 | Baney et al. | 702/118 |
| 7,953,728 | B2 | * | 5/2011 | Hu et al. | 707/719 |
| 8,015,180 | B2 | * | 9/2011 | Hu et al. | 707/719 |
| 2005/0060285 | A1 | * | 3/2005 | Barsness et al. | 707/2 |
| 2005/0108188 | A1 | * | 5/2005 | Santosuosso | 707/1 |
| 2005/0256852 | A1 | * | 11/2005 | McNall et al. | 707/3 |
| 2006/0136458 | A1 | * | 6/2006 | Elko et al. | 707/101 |
| 2006/0190430 | A1 | * | 8/2006 | Luo et al. | 707/3 |
| 2006/0200807 | A1 | * | 9/2006 | Bates et al. | 717/129 |
| 2007/0239664 | A1 | * | 10/2007 | Barsness et al. | 707/2 |
| 2008/0063180 | A1 | * | 3/2008 | Barsness et al. | 379/265.14 |
| 2008/0071759 | A1 | * | 3/2008 | Santosuosso | 707/4 |
| 2008/0120574 | A1 | * | 5/2008 | Heredia et al. | 715/835 |
| 2008/0288446 | A1 | * | 11/2008 | Hu et al. | 707/2 |
| 2008/0288473 | A1 | * | 11/2008 | Hu et al. | 707/4 |
| 2008/0306711 | A1 | * | 12/2008 | Bansal | 702/182 |
| 2009/0327214 | A1 | * | 12/2009 | Richardson et al. | 707/2 |

OTHER PUBLICATIONS

Tozer et al.—"Q-COP: Avoiding Bad Query Mixes to Minimize Client Timeouts under Heavy Loads"—2010 IEEE ICDE Conference Apr. 15, 2010 (pp. 397-408).*
Tai-Yi Huang, Jane W.-S. Liu, and David Hull—"A Method for Bounding the Effect of DMA VO Interference on Program Abstract Execution Time"—Real-Time Systems Symposium, Dec. 4-6, 1996, The 17th, IEEE 1996, (pp. 275-285).*
Vanja Josifovski, Peter Schwarz, Laura Haas and Eileen Lin—"Garlic: A New Flavor of Federated Query Processing for DB2"—Proceeding SIGMOD '02 Proceedings of the 2002 ACM SIGMOD international conference on Management of data ACM SIGMOD '2002 Jun. 4-6, 2002, Madison, Wisconsin, USA—(pp. 524-532).*

* cited by examiner

*Primary Examiner* — Jean B Fleurantin
*Assistant Examiner* — Anh Ly
(74) *Attorney, Agent, or Firm* — Patterson & Sheridan LLP (57) ABSTRACT

Techniques are described for managing query execution by estimating and monitoring query execution time. Embodiments of the invention may generally receive a query to be executed and calculate an initial estimated execution time for the received query. If the initial estimated execution time does not exceed a threshold amount of time, embodiments of the invention may submit the query for execution. Once execution of the query has begun, embodiments of the invention may calculate an updated estimated execution time for the executing query, and if the updated estimated execution time exceeds the threshold amount of time, may halt the execution of the query.

17 Claims, 7 Drawing Sheets

ESTIMATING AND MONITORING QUERY PROCESSING TIME

BACKGROUND

The present invention generally relates to database management, and more particularly, to managing query execution by estimating and monitoring query processing time.

DESCRIPTION OF THE RELATED ART

Databases are computerized information storage and retrieval systems. A relational database management system is a computer database management system (DBMS) that uses relational techniques for storing and retrieving data. An object-oriented programming database is a database that is congruent with the data defined in object classes and subclasses.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests (i.e., queries) are often made using high-level query languages such as the Structured Query Language (SQL). Upon receiving such a request, the DBMS may execute the request against a corresponding database, and return any result of the execution to the requesting entity.

As databases grow in size and in workload, particular queries may take a substantial amount of time and resources to execute. As such, database administrators may wish to limit the amount of time and resources a particular query can take to execute.

SUMMARY

Embodiments of the invention provide a method, system and computer program product for managing the execution of a query. The method, system and computer program product include receiving a query to be executed. Additionally, the method, system and computer program product include calculating an initial execution time for the received query. The method, system and computer program product also include upon determining the calculated initial execution time does not exceed a first threshold amount of time, executing the query by operation of one or more computer processors. Furthermore, the method, system and computer program product include calculating an updated execution time for the received query while the query is executing. The method, system and computer program product also include halting the execution of the query upon determining that the updated execution time exceeds a second threshold amount of time.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Many DBMS include some form of query governor. Query governors generally control how long queries may execute. For example, a query governor may enable a database administrator to have queries time out (i.e., execution of the query is halted) if a predetermined amount of time elapses before the execution completes. Additionally, before the database executes the query, a query governor may estimate the time it will take to execute the query, and if the estimated time exceeds a threshold amount, may reject the query. Continuing this example, if the query governor determines the estimated time is less than or equal to the threshold amount, the query governor may submit the query to the database for execution.

Embodiments of the invention generally calculate an initial estimated execution time for a received query statement. If the initial estimated execution time exceeds a predetermined threshold amount of time, embodiments of the invention may reject the query for execution. Upon determining that the initial estimated execution time does not exceed the predetermined threshold amount of time, embodiments of the invention may begin execution of the query statement. Once execution of the query has begun, embodiments of the invention may then determine an estimated remaining execution time for the executing query. If the estimated remaining execution time exceeds a second predetermined threshold amount of time, embodiments of the invention may halt the execution of the query, and reject the query for execution. If, instead, the estimated remaining execution time does not exceed the second predetermined threshold amount of time, embodiments of the invention may allow the execution of the query to finish.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the DBMS) available in the cloud. For example, the DBMS could execute on a computing system in the cloud and receive user requests (e.g., queries) to access databases managed by the DBMS. In such a case, an autonomic query governor may calculate an estimated execution time of a received request, and then determine whether to submit the query to the DBMS for execution based on the determined execution time. If the autonomic query governor does submit the query for execution, the autonomic query governor may further monitor the execution of the query and calculate an estimated remaining execution time for the query. Doing so allows a user to access the database information from any computing system attached to a network connected to the cloud (e.g., the Internet).

Figure 1A:
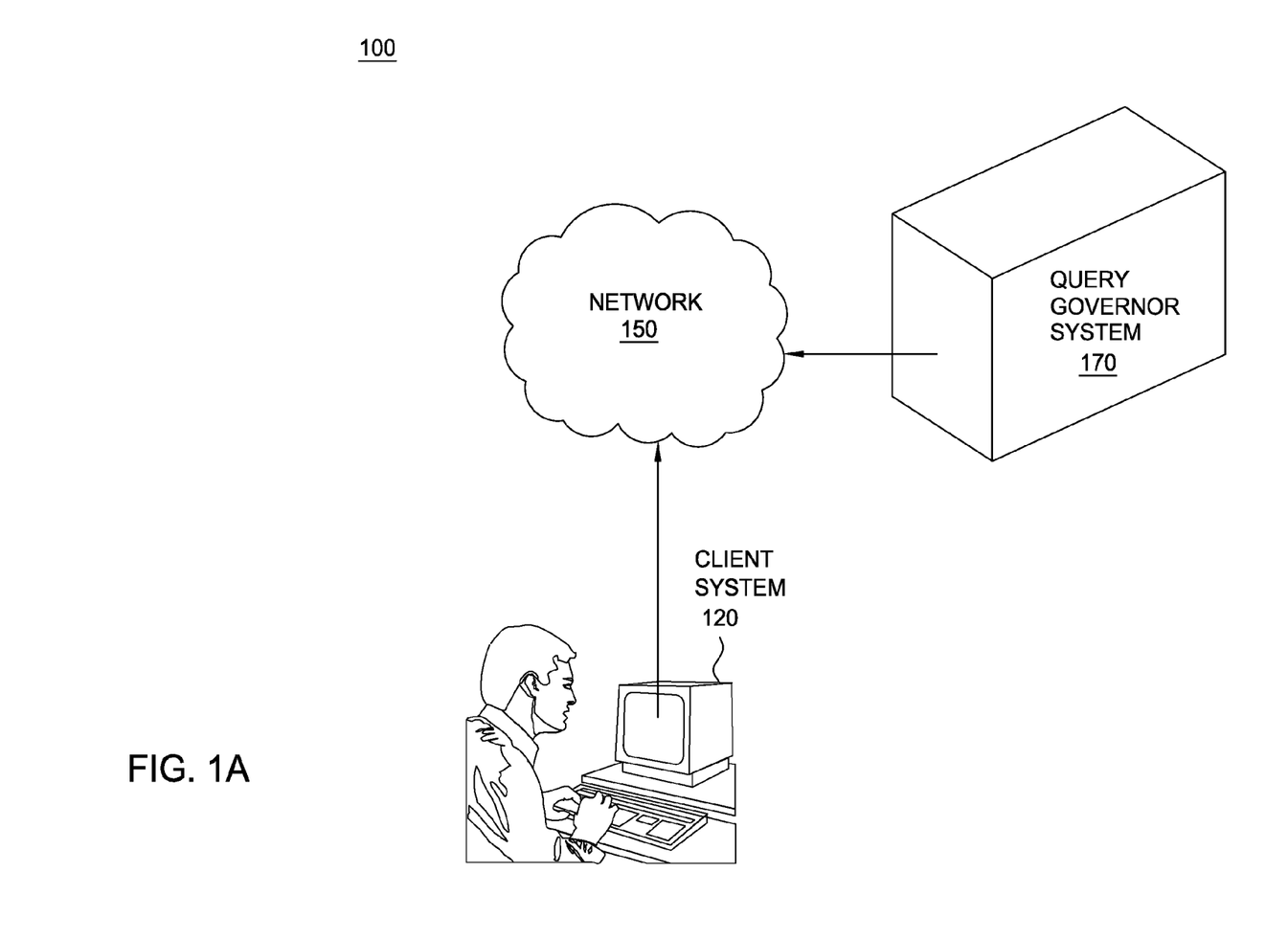
FIG. 1A-1B are block diagrams illustrating a networked system for estimating and monitoring query processing time, according to embodiments of the invention.
Figure 1B:
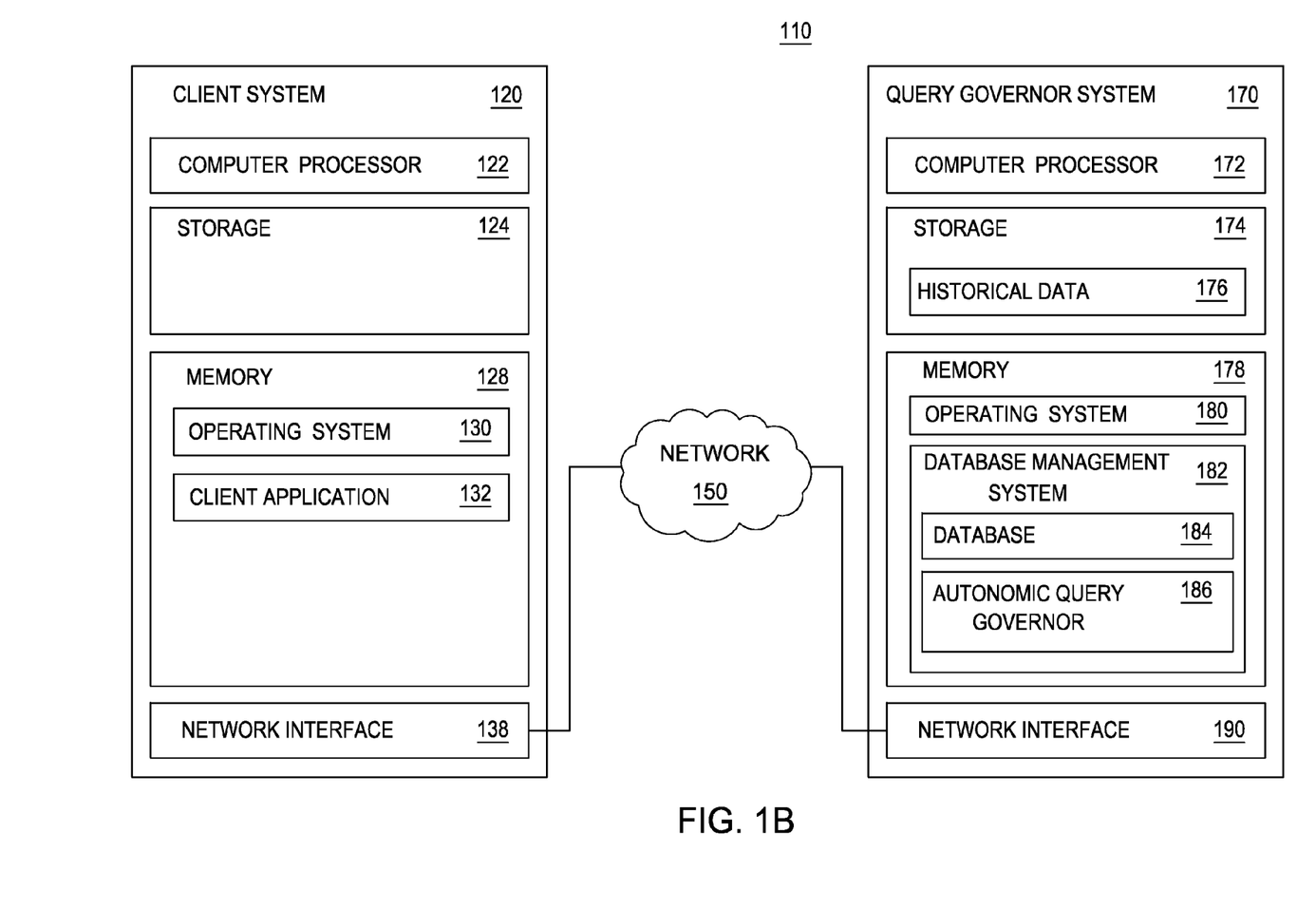

FIG. 1A-1B are block diagrams illustrating a networked system for estimating and monitoring query processing time, according to embodiments of the invention. As shown, FIG. 1A is a block diagram illustrating a networked system for estimating and monitoring query processing time, according to one embodiment of the invention. In the depicted embodiment, the system 100 includes a client system 120 and a query governor system 170, connected by a network 150. Generally, the client system 120 may submit requests (i.e., queries) over the network 150 to a DBMS running on the query governor system 170. The term "query" denominates a set of commands for retrieving data from a stored database. Queries take the form of a command language, such as the Structured Query Language (SQL), that lets programmers and programs select, insert, update, find out the location of data, and so forth. Generally speaking, any requesting entity can issue queries against data in a database. For example, software applications (such as by an application running on the client system 120), operating systems, and, at the highest level, users may submit queries to the database. These queries may be predefined (i.e., hard coded as part of an application) or may be generated in response to input (e.g., user input). Upon receiving the request, the DBMS on the query governor system 170 may execute the request against a database specified in the request, and then return the result of the executed request.

However, it may be desirable for the query governor system 170 to only process certain requests it receives. That is, if a particular request would take an excessively long amount of time to process, the query governor system 170 may wish to reject this query. According to embodiments of the invention, the query governor system 170 may include an autonomic query governor configured to determine which received requests the DBMS should be executed. As used herein, a query governor or autonomic query governor refers to any entity that estimates and/or monitors query execution time. In one embodiment of the invention, upon receiving a query from the client system 120, the query governor may calculate an estimated execution time for the query. If the query governor then determines that the estimated execution time exceeds a predetermined threshold amount of time, the query governor may refuse the query for processing. For example, assume that the threshold amount of time is 2 minutes. If the query governor receives a query and estimates it will take 5 minutes to process the received query, the query governor may refuse the query for processing, and may notify the client system 120 accordingly.

In an alternate embodiment, upon determining that the estimated execution time exceeds the threshold amount of time, the query governor may wait for some predetermined period of time and then recalculate the estimated execution time for the received query. The query governor may then determine whether the recalculated estimated execution time exceeds the threshold amount of time, and if it does, refuse the query for processing. In one embodiment of the invention, the query governor may be configured to wait for a period of time and recalculate the estimated execution time repeated times. By doing this, embodiments of the invention may account for the situation where the initial estimated execution time for the query was artificially high because, for instance, the query governor system experienced a momentary spike in workload. However, if the recalculated estimated execution times repeatedly exceed the threshold amount of time, the query governor may determine that the estimated execution time is accurate, and may reject the query for processing.

Furthermore, if the autonomic query governor determines that the estimated execution time does not exceed the threshold amount of time, the query governor may submit the query to the DBMS for processing. Once the processing of the query has begun, the autonomic query governor may periodically calculate an updated estimated execution time for the query. If, while the query is executing, the query governor determines that the updated estimated execution time exceeds the threshold amount of time, the query governor may halt the execution of the query. For example, assume that the threshold amount of time is 2 minutes, and further assume that the query governor calculates the initial estimated execution time to be 1 minute. Because the estimated execution time does not exceed the predetermined threshold amount of time, the query governor will submit the query to the DBMS for execution.

However, continuing with the example, if, while the query is executing, the query governor calculates an updated estimated execution time of 5 minutes for processing the query, the query governor may then halt the execution of the query, because the updated execution time of 5 minutes exceeds the threshold amount of time of 2 minutes. The difference between the initial estimated execution time and the updated estimated execution time may be the result of, for instance, a spike in the workload of the query governor system 170. As a second example, the difference may be the result of inaccurate data used to calculate the initial estimated execution time. As such, embodiments of the invention enable the implementation of a more accurate, and thus a more useful query governor.

Referring now to FIG. 1B, FIG. 1 is a block diagram of a networked computer system configured to estimate and monitor query processing time, according to one embodiment of the invention. As shown, the system 110 contains a client system 120 and a query governor system 170. The client system 120 contains a computer processor 122, storage media 124, memory 128 and a network interface 138. Computer processor 122 may be any processor capable of performing the functions described herein. The client system 120 may connect to the network 150 using the network interface 138. Furthermore, as will be understood by one of ordinary skill in the art, any computer system capable of performing the functions described herein may be used.

In the pictured embodiment, memory 128 contains an operating system 130 and a client application 132. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The client application 132 is generally capable of generating database queries. Once the client application 132 generates a query, the query may be submitted to a DBMS (e.g., DBMS 182) for execution over the network 150. The operating system 130 may be any operating system capable of performing the functions described herein.

The query governor system 170 contains a computer processor 172, storage media 174, memory 178 and a network interface 190. Computer processor 172 may be any processor capable of performing the functions described herein. The storage media 174 contains historical data 176. The historical data 176 may include data and metadata on previously executed queries. For example, in one embodiment of the invention, the historical data 176 includes information about the amount of time required to execute previously executed queries. The query governor system 170 may connect to the network 150 using the network interface 190. Furthermore, as will be understood by one of ordinary skill in the art, any computer system capable of performing the functions described herein may be used.

In the pictured embodiment, memory 178 contains an operating system 180 and a DBMS 182. Although memory 178 is shown as a single entity, memory 178 may include one or more memory devices having blocks of memory associated with physical addresses, such as random access memory (RAM), read only memory (ROM), flash memory or other types of volatile and/or non-volatile memory. The DBMS 182 contains a database 184 and an autonomic query governor 186. The operating system 180 may be any operating system capable of performing the functions described herein.

Generally, the client application 132 may generate and submit queries to the DBMS 182 using the network 150. According to embodiments of the invention, once the DBMS 182 receives a query, the autonomic query governor 186 may calculate an estimated processing time for the query. Such a calculation may be based on values in the received query. For example, the query governor 186 may determine that a SELECT statement from a particular table in the database 184 will require 30 seconds to process. Additionally, the calculation may be based on collected metadata describing the received query. As an example, the query governor 186 may determine that because the query was received during peak processing hours (e.g., by using a timestamp for when the query was received), the query governor system 170 will have fewer resources available for processing the query, and thus the query will require an additional 60 seconds to execute. Furthermore, the query governor 186 may use the historical data 176 in calculating the estimated processing time for the received query. Thus, for example, the historical data 176 may contain data indicating that the DBMS 182 has previously processed a similar (or identical) query to the received query. In such a case, the query governor 186 may calculate the estimated processing time for the received query based on a record processing time for the previously processed query stored in the historical data 176. Of course, the above examples are merely for illustrative purposes, and one of ordinary skill in the art will recognize that other data, metadata and historical data, as well as combinations therebetween, may be used as well.

Figure 2:
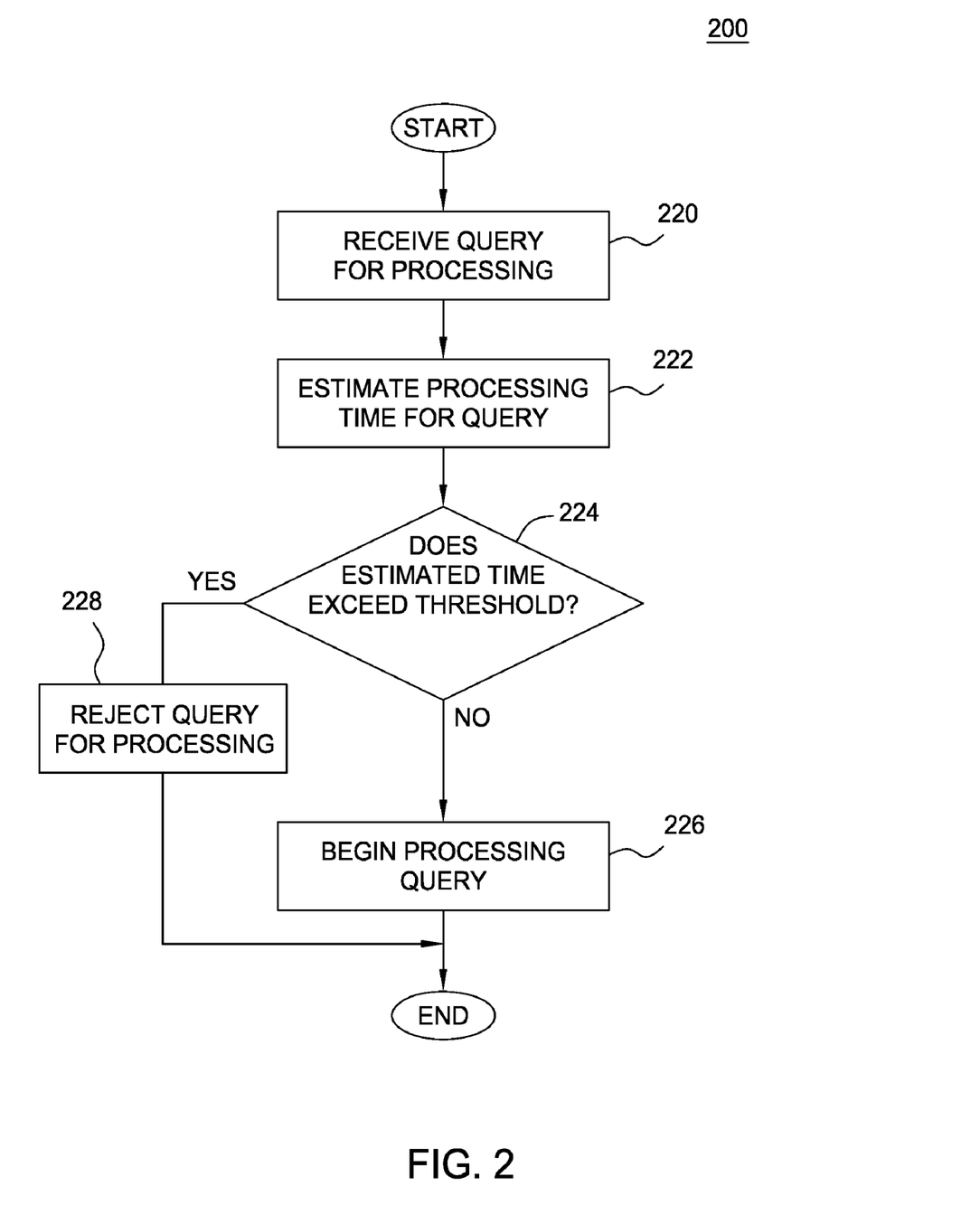
FIG. 2 is a flow diagram illustrating a method of managing query execution, according to one embodiment of the invention.

FIG. 2 is a flow diagram illustrating a method of managing query execution, according to one embodiment of the invention. As shown, the method 200 begins at step 220, where the autonomic query governor 186 receives a query for processing. Upon receiving the query, the autonomic query governor 186 calculates an estimated processing time for executing the received query (step 222). As discussed above, the estimated processing time may be calculated using data contained in the received query, metadata describing the received query, or historical data 176. Additionally, the query governor 186 may calculate the estimated processing time based on information about the query governor system 170. For example, the query governor 186 may use resource information for the query governor system 170 to calculate the estimated processing time. As an example, such resource information may include the type of computer processor 172 in the query governor system 170, the speed of the computer processor 172, the number of processors 172, the amount of memory 178, etc. Furthermore, the query governor 186 may calculate the estimated processing time based on workload information about the query governor system 170. Exemplary workload information includes CPU usage, memory usage, virtual memory usage, disk I/O, etc.

Once the estimated processing time is calculated, the autonomic query governor 186 determines whether the estimated processing time exceeds a threshold amount of time (step 224). In one embodiment of the invention, the threshold amount of time is a preset (e.g., by a database administrator) amount of time that is used for all queries received by the DBMS 182. In another embodiment of the invention, the threshold amount of time is based on the type of query received by the DBMS 182. For example, the threshold time for a SELECT statement may differ from the threshold time for an INSERT statement. In yet another embodiment, the threshold amount of time is based on a priority value assigned to the incoming query. For instance, the priority value may be assigned based on the origin of the query. Thus, for example, a query statement received from a customer-facing production-stage application may receive a longer threshold time than a query received from an internal application that is still under development. Additionally, the threshold amount of time may be derived from other factors, examples of which include without limitation which user submitted the query and which group the user submitting the query belongs to. Of course, the above examples are for illustrative purposes only, and one of ordinary skill in the art will realize that other factors may be used as well.

If the query governor 186 determines that the estimated processing time exceeds the threshold amount of time, the query governor 186 rejects the query for processing (step 228). The query governor 186 may further notify the client application 132 that submitted the query. For example, the query governor 186 may return a message to the client application 132 that submitted the query, indicating that the query was rejected for processing because of the estimated execution time. If instead the query governor 186 determines that the estimated processing time does not exceed the threshold amount of time, the query governor 186 submits the query for processing (step 226). Once the query is submitted for processing, or once the query governor 186 rejects the query for processing, the method 200 ends.

Figure 3:
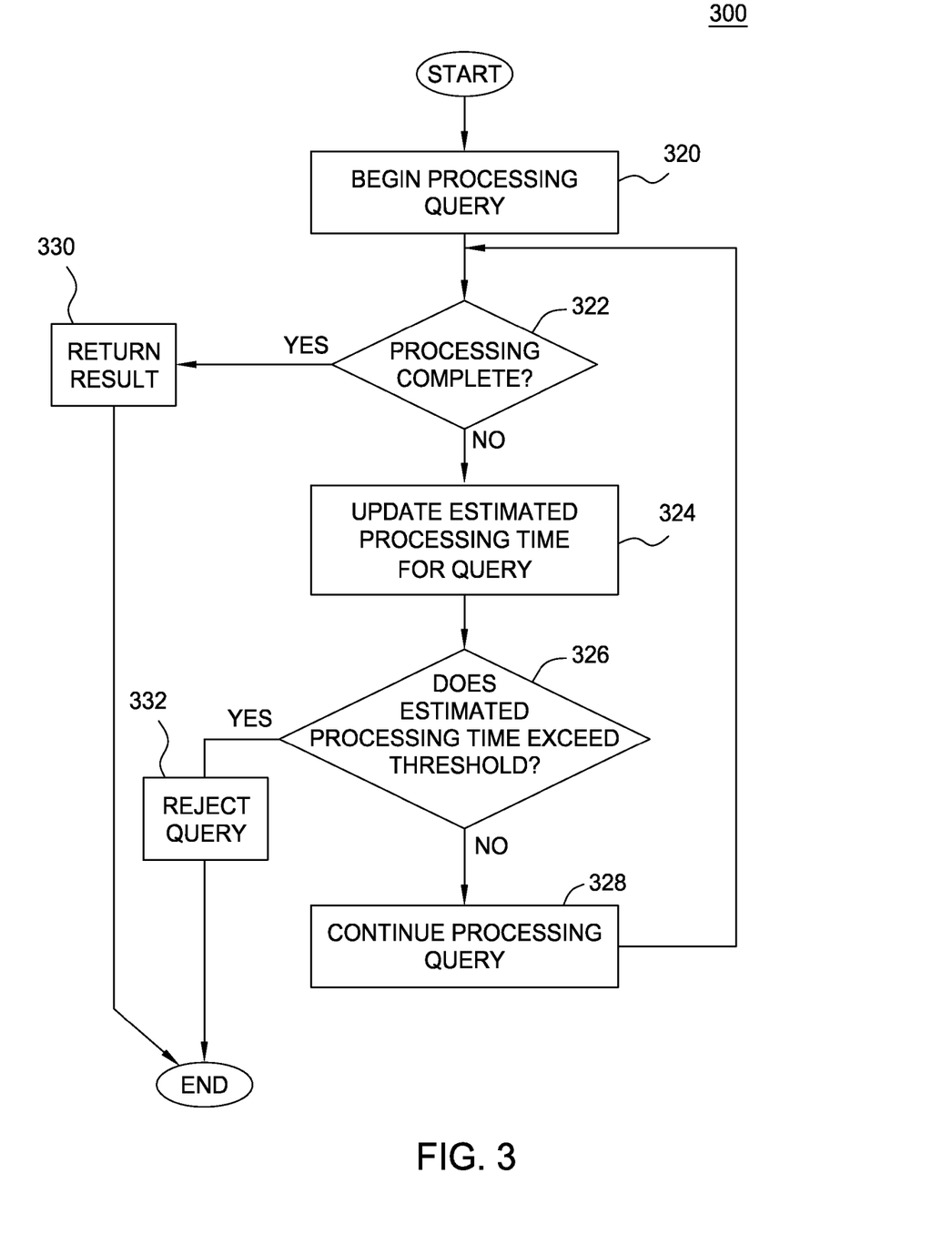
FIG. 3 is a flow diagram illustrating a method of managing query execution, according to one embodiment of the invention.

FIG. 3 is a flow diagram illustrating a method of managing query execution, according to one embodiment of the invention. As shown, the method 300 begins at step 320, where the DBMS 182 begins processing the received query. For example, the DBMS 182 may begin processing the query after the completion step 226 of the method 200 discussed above. Once the execution of the query has begun, the query governor 186 determines whether the execution of the query has completed (step 322). If the execution of the query has completed, the DBMS 182 returns the result of executing the query (step 330). Generally, the DBMS 182 will return the result produced from executing the query to whatever entity submitted the query. Thus, for example, if the query was submitted by a client application 132, the DBMS 182 will return the result to the client application 132.

If instead the query governor 186 determines that execution of the query has not completed, the query governor 186 calculates an updated estimated processing time for the query (step 324). The updated estimated processing time may be based on the factors discussed above in calculating the initial estimated processing time. Of note, the values of the factors used to calculate the updated estimated processing time may have changed since the initial estimated processing time was calculated. For example, the query governor system 170 may have been idle when the query was initially received, and so the query governor 186 may have calculated a relatively short initial estimated execution time for the query. However, when the updated estimated time is calculated, the workload of the system 170 may be substantially higher, thus resulting in a longer estimated execution time for the same query. Additionally, the updated estimated processing time may be based on how much of the query execution has been completed thus far. As an example, assume the initial query execution time as calculated to be 60 seconds. If, however, after 60 seconds, only 50% of the query has been executed, the query governor 186 may determine that the updated estimated processing time for the query is 120 seconds, based on the 60 seconds required to execute 50% of the query.

In an alternate embodiment of the invention, the query governor 186 may determine a plurality of operations involved in the execution of the query, and may determine a separate estimated execution time for each portion of the query execution. As an example, the query governor 186 may determine that a first portion of the query execution involves a SELECT statement executed against the database 184, and a second portion of the query execution involves a request submitted to a third party service. Continuing the example, the query governor 186 may further calculate that the first portion will take an estimated 60 seconds to execute, while the second portion will take an estimated 15 seconds to execute. Thus, the query governor 186 may calculate that the estimated execution time for the entire query is 75 seconds.

The query governor 186 then determines whether the updated estimated processing time exceeds the threshold amount of time (step 326). The threshold amount of time may be the same as the threshold amount of time used initially. Alternatively, and especially when the threshold amount of time is a calculated value, the threshold amount of time may be different than the threshold used initially. If the query governor 186 determines that the updated estimated processing time does exceed the threshold amount of time, the query governor 186 halts the execution of the query and rejects the query for processing (step 332). As used herein, halting the execution of the query may mean either suspending the execution or termination the execution of the query. When the execution is suspended, the state of the query execution is saved, such that the DBMS may resume processing the query from the point the query was suspended. If the execution is terminated, the DBMS would resume processing the query from the beginning. On the other hand, if the query governor 186 determines the updated estimated time does not exceed the threshold amount of time, then the execution of the query continues (step 328), and the method begins again at step 322, where the query governor again determines whether the query has finished executing. Once the DBMS 182 returns the result of the query, or once the query governor halts the execution of the query and rejects the query for execution, the method 300 ends.

Advantageously, the method 300 enables the DBMS 182 to avoid processing queries that would consume an excessive amount of time and system resources to process. That is, if the query governor 186 determines that a particular query will take an excessive amount of time to process, the query governor 186 rejects the query for processing, and halts the execution of the query, if it has already begun. A further advantage of the method 300 is even if the autonomic query governor 186 calculates an incorrect initial estimated processing time, the query governor 186 may correct this mistake when the updated estimated execution time is calculated. For instance, the initial estimated execution time may be incorrect because the data used to calculate the estimated time was incorrect or incomplete. However, if the query governor 186 detects that the query is taking longer than was initially estimated to complete, and further determines that, based on the execution time elapsed so far and the updated estimated execution time, the query execution will not be able to complete within the threshold amount of time, the query governor 186 may halt the execution of the query and reject the query for processing. Thus, a further advantage of the method 300 is that the query governor 186 may detect the query will not be able to complete within the threshold amount of time, even after the initial estimated time is calculated, but before the threshold amount of time has elapsed. As such, even when the initial estimated execution time is incorrect, the method 300 minimizes any wasted processing time to the query governor system 170.

Figure 4A:
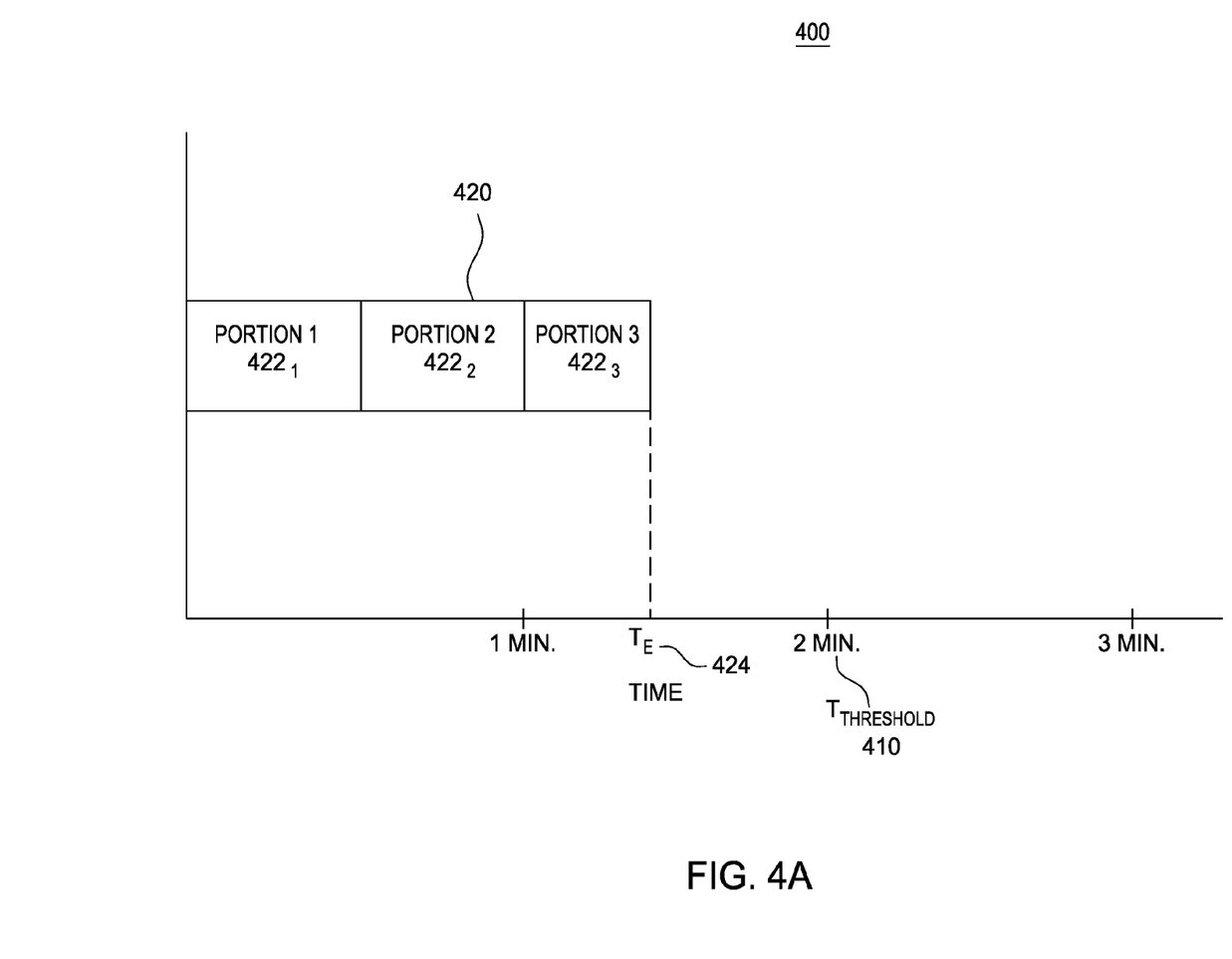
FIGS. 4A-4C are exemplary timelines illustrating estimated processing times, according to one embodiment of the invention.
Figure 4B:
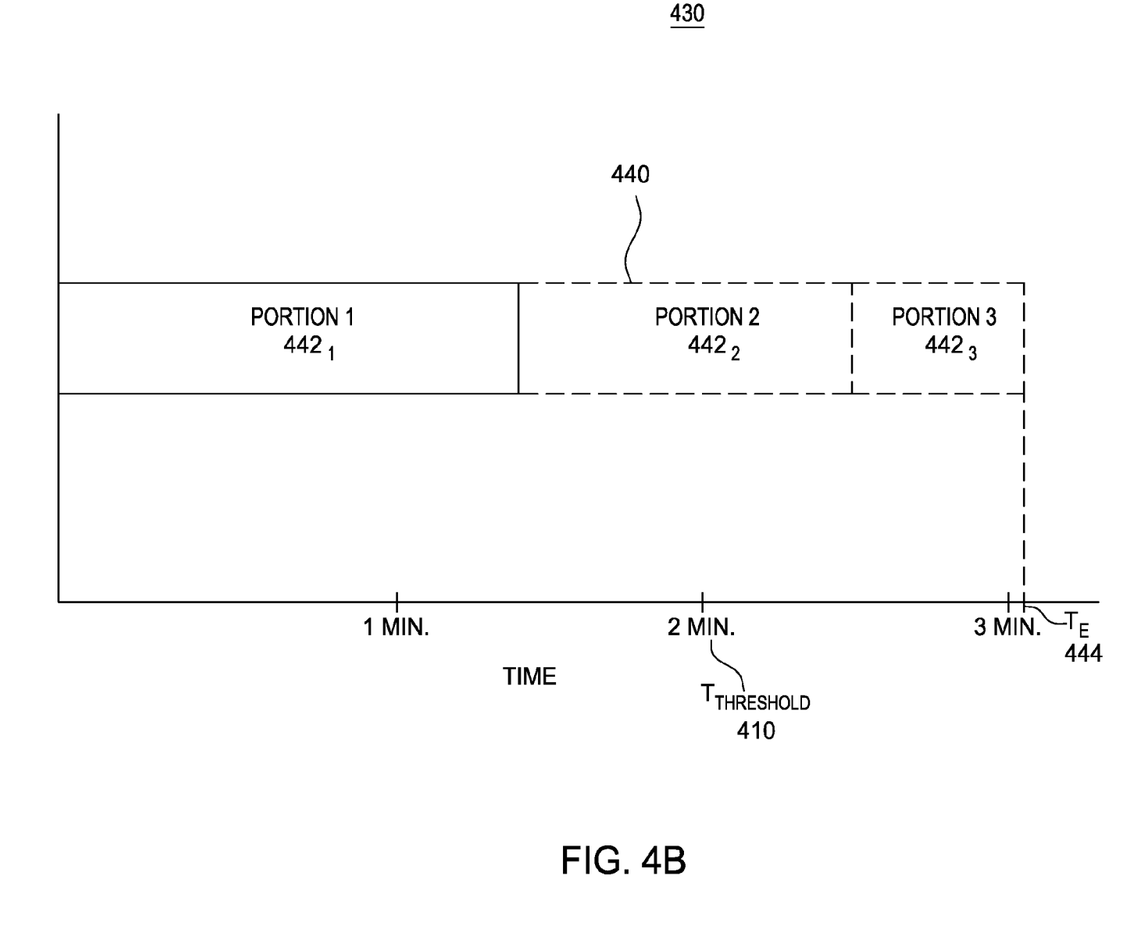
Figure 4C:
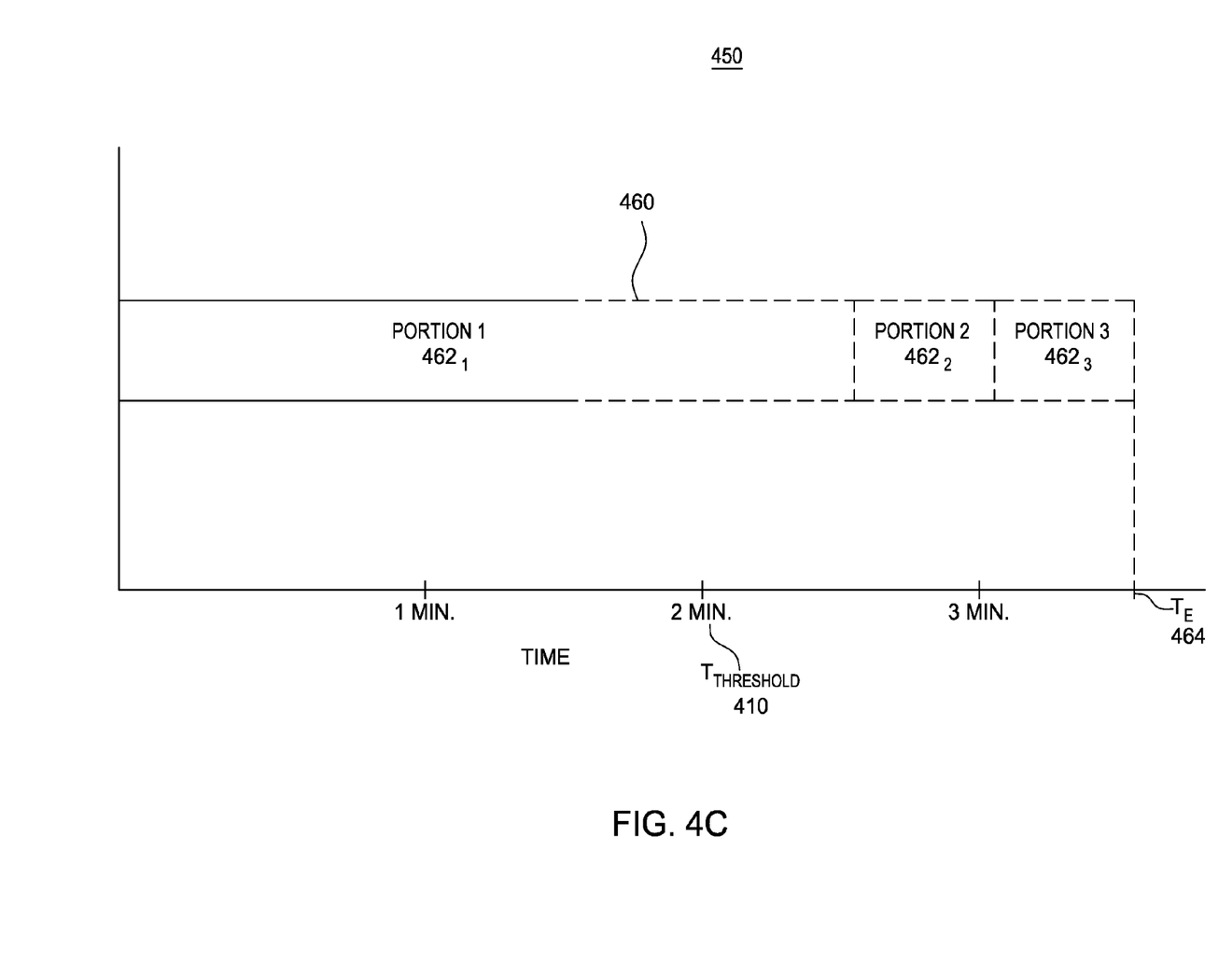

FIGS. 4A-4C are exemplary timelines illustrating estimated processing times, according to one embodiment of the invention. As shown, FIG. 4A shows an exemplary timeline 400 illustrating an estimated processing time 420 for a particular query. In the depicted example, the query governor 186 may have determined that the execution of the query will include three separate operations, and has calculated an estimated processing time for each portion 422. Furthermore, the query governor 186 may have determined the total estimated processing time for the particular query is $T_E$ 424. Additionally, the timeline 400 shows that the threshold time $T_{threshold}$ 410 in this example is 2 minutes. Thus, because in the depicted example the estimated processing time $T_E$ 424 is less than the threshold time $T_{threshold}$ 410, the query governor 186 may determine (e.g., at step 224) that the particular query will execute in a sufficient amount of time, and will allow the query to be executed. Alternatively, if the execution of the query has already begun, the query governor 186 may determine (e.g., at step 326) that the particular query will finish executing in a sufficient amount of time, and will allow the execution of the query to continue. As such, the timeline 400 shows an estimated execution time for a query in the acceptable range of estimated execution times (i.e., less than the threshold time $T_{threshold}$ 410).

FIG. 4B shows an exemplary timeline 430 illustrating an estimated processing time 440 for a particular query. In the depicted example, the query governor 186 may have determined that the execution of the query will include three separate operations, and has calculated an estimated processing time for each portion 442. Furthermore, the query governor 186 may have determined the total estimated processing time for the particular query is $T_E$ 444. Additionally, the timeline 430 shows that the threshold time $T_{threshold}$ 410 in this example is 2 minutes. Thus, because the estimated processing time $T_E$ 444 is greater than the threshold time $T_{threshold}$ 410, the query governor 186 may determine (e.g., at step 224) that the particular query will not execute in a sufficient amount of time, and thus will reject the query for execution. Alternatively, if the execution of the query has already begun, the query governor 186 may determine (e.g., at step 326) that the particular query will not finish executing within in a sufficient amount of time, and thus will halt the execution of the query and reject the query for processing.

In the depicted example, portion 1 442$_1$ of the received query has finished executing in less than the threshold amount of time $T_{threshold}$ 410. However, as shown, the query governor 186 estimates that portion 2 442$_2$ and portion 3 442$_3$ of the received query will not finish executing until time $T_E$ 444. Since the estimated completion time $T_E$ 444 for executing the received query exceeds the threshold amount of time $T_{threshold}$ 410, the query governor 186 may halt the execution of the query and reject the query for processing.

Advantageously, because the autonomic query governor 186 detects the query will not complete within the threshold amount of time after the first portion 442$_1$ of the query has executed, the query governor 186 may halt the execution of the query before the threshold amount of time $T_{threshold}$ 410 has passed. Thus, even if the calculated initial estimated execution time was incorrect (e.g., because of incorrect data), the autonomic query governor 186 may correct this mistake and halt the execution of the query, without waiting on the threshold amount of time $T_{threshold}$ 410 to expire.

As shown, FIG. 4C shows an exemplary timeline 450 illustrating an estimated processing time 460 for a particular query. In the depicted example, the query governor 186 may have determined that the execution of the query will include three separate operations, and has calculated an estimated processing time for each portion 462. Furthermore, the query governor 186 may have determined the total estimated processing time for the particular query is $T_E$ 464. Additionally, the timeline 400 shows that the threshold time $T_{threshold}$ 410 in this example is 2 minutes. Thus, because the estimated processing time $T_E$ 464 is greater than the threshold time $T_{threshold}$ 410, the query governor 186 may determine (e.g., at step 224) that the particular query will not execute in a sufficient amount of time, and thus will reject the query for execution. Alternatively, if the execution of the query has already begun, the query governor 186 may determine (e.g., at step 326) that the particular query will not finish executing within in a sufficient amount of time, and thus will halt the execution of the query and reject the query for processing.

As shown, the autonomic query governor 186 has calculated the updated estimated execution time 460 while portion 1 462₁ of the query is in the process of executing. Thus, in the depicted example, portion 1 462₁ of the query is taking longer than was originally estimated (e.g., in FIG. 4A) to complete. For example, portion 1 462₁ of the query may reference a third party service, and the connection to the third party service may be experiencing connection problems. As a second example, portion 1 462₁ of the query may be delayed simply because the workload of the query governor system 170 has increased from when the initial estimated execution time was calculated. Thus, because the estimated processing time $T_E$ 464 is greater than the threshold time $T_{threshold}$ 410, the query governor 186 will thus halt the execution of the query and reject the query for processing.

Advantageously, because the autonomic query governor 186 calculates the updated estimated execution time $T_E$ 464 before the threshold amount of time $T_{threshold}$ 410 has elapsed, the query governor 186 may halt the execution of the query without waiting on the threshold amount of time $T_{threshold}$ 410 to expire. Thus, even if the initial estimated execution time is calculated incorrectly, the autonomic query governor 186 mitigates the impact of this incorrect calculation by periodically calculating the updated estimated execution time for the received query. As such, the autonomic query governor 186 mitigates the wasteful usage of processing resources on the query governor system 170.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of managing the execution of a query, comprising:
   receiving a query to be executed;
   determining a plurality of operations involved in executing the received query;
   calculating an initial execution time for the received query, based on a calculated estimated execution time for each of the determined plurality of operations;
   upon determining the calculated initial execution time does not exceed a first threshold amount of time, executing the query by operation of one or more computer processors;
   calculating an updated execution time for the received query while the query is executing; and
   halting the execution of the query upon determining that the updated execution time exceeds a second threshold amount of time.

2. The method of claim 1, wherein calculating an updated execution time for the received query is further based on historical data collected from previously executed queries.

3. The method of claim 1, wherein the query is received from a user, and further comprising:
   upon halting the execution of the query, returning a message to the user indicating that execution of the query was halted.

4. The method of claim 1, wherein calculating the updated execution time is further based on one or more values in the received query.

5. The method of claim 1, further comprising collecting metadata describing the received query, wherein calculating the updated execution time is further based on the collected metadata describing the received query.

6. The method of claim 1, wherein the threshold amount of time is based on at least one of (i) a predetermined threshold value, (ii) an origin of the received query, and (iii) a priority value associated with the received query.

7. The method of claim 1, further comprising resuming the execution of the halted query.

8. The method of claim 1, further comprising recalculating the initial execution time for the received query, wherein the query is executed only upon determining that the recalculated initial execution time does not exceed a first threshold amount of time.

9. A system, comprising:
   a computer processor; and
   a memory containing a program that, when executed on the computer processor, performs an operation for managing the execution of a query, comprising:
   receiving a query to be executed;
   determining a plurality of operations involved in executing the received query;
   calculating an initial execution time for the received query, based on a calculated estimated execution time for each of the determined plurality of operations;
   upon determining the calculated initial execution time does not exceed a first threshold amount of time, executing the query;
   calculating an updated execution time for the received query while the query is executing; and
   halting the execution of the query upon determining that the updated execution time exceeds a second threshold amount of time.

10. The system of claim 9, wherein calculating an updated execution time for the received query is further based on historical data collected from previously executed queries.

11. The system of claim 9, wherein the query is received from a user, and further comprising:
  upon halting the execution of the query, returning a message to the user indicating that execution of the query was halted.

12. The system of claim 9, wherein calculating the updated execution time is further based on one or more values in the received query.

13. The system of claim 9, the operation further comprising collecting metadata describing the received query, wherein calculating the updated execution time is further based on the collected metadata describing the received query.

14. The system of claim 9, wherein the threshold amount of time is based on at least one of (i) a predetermined threshold value, (ii) an origin of the received query, and (iii) a priority value associated with the received query.

15. The system of claim 9, the operation further comprising resuming the execution of the halted query.

16. The system of claim 9, the operation further comprising recalculating the initial execution time for the received query, and wherein the query is executed only upon determining that the recalculated initial execution time does not exceed a first threshold amount of time.

17. A computer program product for managing the execution of a query, comprising:
  a computer-readable storage medium having computer readable program code embodied therewith, the computer readable program code comprising:
  computer readable program code to receive a query to be executed;
  computer readable program code to determine a plurality of operations involved in executing the received query;
  computer readable program code to calculate an initial execution time for the received query, based on a calculated estimated execution time for each of the determined plurality of operations;
  computer readable program code to, upon determining the calculated initial execution time does not exceed a first threshold amount of time, execute the query;
  computer readable program code to calculate an updated execution time for the received query while the query is executing; and
  computer readable program code to halt the execution of the query upon determining that the updated execution time exceeds a second threshold amount of time.

\* \* \* \* \*